United States Patent [19]

Nakano et al.

[11] Patent Number: 5,048,584

[45] Date of Patent: Sep. 17, 1991

[54] RADIAL TIRE FOR CONSTUCTION VEHICLE

[75] Inventors: Minoru Nakano, Koganei; Akihito Goto; Yoichi Nakamura, both of Kodaira, all of Japan

[73] Assignee: Bridgestone Corporation, Tokyo, Japan

[21] Appl. No.: 452,934

[22] Filed: Dec. 19, 1989

[30] Foreign Application Priority Data

Dec. 22, 1988 [JP] Japan ............................... 63-322153

[51] Int. Cl.$^5$ .............................................. B60C 15/06
[52] U.S. Cl. .................................. 152/543; 152/546; 152/552; 152/555
[58] Field of Search ............... 152/539, 540, 542, 543, 152/545, 546, 552, 555

[56] References Cited

U.S. PATENT DOCUMENTS

| | | |
|---|---|---|
| 3,612,138 | 10/1971 | Ravenhall . |
| 3,638,705 | 2/1972 | Devienne et al. . |
| 3,774,663 | 11/1973 | Montagne . |
| 4,185,677 | 1/1980 | Motomura et al. . |
| 4,398,584 | 8/1983 | Tansei et al. . |
| 4,688,616 | 8/1987 | Iuchi ............................... 152/543 X |
| 4,716,950 | 1/1988 | Morikawa et al. ............. 152/541 X |
| 4,790,366 | 12/1988 | Kadota . |

FOREIGN PATENT DOCUMENTS

| | | |
|---|---|---|
| 6993774 | 12/1975 | Australia . |
| 2666577 | 11/1980 | Australia . |
| 0206679 | 12/1986 | European Pat. Off. . |
| 2246406 | 5/1975 | France . |
| 2312383 | 12/1976 | France . |
| 2615453 | 11/1988 | France . |
| 64912 | 7/1972 | Luxembourg . |

Primary Examiner—Michael W. Ball
Assistant Examiner—Nancy T. Krawczyk
Attorney, Agent, or Firm—Sughrue, Mion, Zinn, Macpeak & Seas

[57] ABSTRACT

A radial tire for a construction vehicle includes a tread, a pair of sidewalls extending radially inwardly and terminating in inner edges having bead cores embedded therein, a carcass made of a steel cord ply extending between the bead cores, a belt arranged between the carcass and the tread to form with the carcass a main reinforcing layer, and bead reinforcing layers. Each of the bead reinforcing layers includes at least two sets of fiber cord layers. Each of the sets has at least two fiber cord layers. The at least two sets of the fiber cord layers are arranged extending radially outwardly from the proximity of an axially outer portion of the bead core and spaced each other to have a minimum spaced distance in the proximity of the bead core and a maximum spaced distance at radially outer end between the two sets of fiber cord layers, said fiber cord layers within said sets being substantially uniformly spaced from each other.

18 Claims, 8 Drawing Sheets

FIG_2

FIG_3

FIG_4

FIG_5

FIG_6

FIG_7

FIG_8

FIG_9

FIG_11
PRIOR ART

FIG_12
PRIOR ART

FIG_13
PRIOR ART

FIG_14

RADIAL TIRE FOR CONSTUCTION VEHICLE

BACKGROUND OF THE INVENTION

This invention relates to a radial tire for a construction vehicle.

Tires applicable to the invention are tires of a size of 18.00-25, wide base tires equivalent thereto of a size of 23.5-25, so-called middle sizes, and gigantic tires, which are used for movable working machinery such as dump trucks, scrapers, front end loaders. The invention is intended to increase the rate of operation of the construction vehicles and to considerably reduce expense of tires which is a high percentage in running cost of the construction vehicles by improving tires used for construction in particularly severe restrictions under extraordinary used conditions of use.

Tires are divided into two main classes along progress in development, tires for on the road and tires for off the road. The former, particularly large tires are represented by those for trucks and buses, while the latter are tires used for the construction vehicles above described and the like.

The tires for trucks and buses are used for running at speeds of the order of from several tens Km/h to one hundred and several tens km/h mainly on paved flat roads. In other words, they are used for high speed running. Therefore, sizes of these tires are 10.00-20 to 11.00-20 in Japan and at the maximum 12.00-20 even in the Western countries although there are some exceptions.

In contrast herewith, tires for construction vehicles and the like are used on rough grounds which are not prepared as roads. In addition to dispersion of fragments or broken pieces of stones and rocks on these grounds, they have large irregularities on their surfaces, so that the tires for construction vehicles are obliged to be used at low speeds. Sizes of these tires range from 18.00-25 to as much as 36.00-51 or 40.00-57. In comparison with such large tires, the tires for trucks and buses may be small type tires.

With tires for trucks and buses running at high speeds; treads of the tires are subjected to repeated forces at high frequencies so that wear-resistance is generally the most important criteria. In contrast herewith, with tires for construction vehicles, they have thick rubbers of treads resulting from the large sizes so that repeated forces acting upon the treads will promote heat generation and heat storage cycles. In other words, the tread rubbers are subjected to repeated strain inputs that generate high temperature heat and the heat is stored due to poor heat transfer of the rubbers. Therefore, there is a risk of high temperature rupture of the rubber due to heat storage.

In view of this, although the allowable continuous maximum speeds of the tires for trucks and buses are 100 km/h according to a standard, those values of tires for construction vehicles are considerably low. For example, allowable maximum speeds of tires for dump trucks are 50 km/h according to JIS (referring now to JATMA YEAR BOOK 1988 in substituting therefor) or 64 km/h according to TRA.

Such limitations of speeds are in connection with the fact that maximum loads of the tires for construction vehicles are larger than those of tires for trucks and buses. For example, maximum loads for both tires of 12.00-24 are as follows at inner pressure of 5 kgf/cm$^2$.

| Tires for trucks and buses | 2,865 kgf (dual wheels) 3,005 kgf |
|---|---|
| Tires for construction vehicles | 3,460 kgf |

As can be seen from these data, the maximum load supporting rate of the tires for the construction vehicles is 1.21-1.15 times higher at the same inner pressure than that of the tires for trucks and buses.

In practice, with tires of 12.00-24 16PR for trucks and buses the maximum load is 3,505 kgf (3,340 kgf for dual wheels) at the normal inner pressure of 6.5 kgf/cm$^2$. As can be seen from this, the tires for construction vehicles must support the same load with the inner pressure lower than that of the tires for trucks and buses.

The same holds true in the tires of larger sizes than that above described because data are calculated by the same calculation equations.

The differences of the tires for construction vehicles in industrial application as to the standards has been explained. The tires for construction vehicles also exhibit differences in conditions of use. The tires for construction vehicles are always under more overloaded conditions than tires for trucks and buses and are of large type having thick tire members and used at relatively slow speeds. Moreover, they are very often used on rough grounds including frequent irregularities and having stones and rocks dispersed thereon. Therefore, the tires for construction vehicles encounter the following difficulties.

(1) Separation failure resulting from thermal fatigue and thermal rupture owing to high temperatures due to excessive heat generation and heat storage, (2) Failure due to cut caused by stones and rocks (high temperature in tread will aid the fault), and (3) Failure at the beads due to excessive strains (resulting from axial compressive loads and bending loads) in bead portions which are tire supporting portions owing to superposition of pulsatile alternate loads caused by riding o stones and rocks and irregularities on roads in addition to large loads.

Among these difficulties, the separation failure of item (1) can be basically solved by utilizing radially arranged carcasses of steel cord plies which have theoretically less heat generation and easy heat dispersion. The failure of item (2) can be basically solved by using thick treads which are also accepted in the standards in addition to utilizing a carcass having a radially arranged steel cord ply. However, the failure of item (3) cannot be basically solved by the above carcasses and there is no solution in standards. Under the present condition that radial tires are essential for solving the problems of the items (1) and (2) although their bead portions are weak points in comparison with bias tires using nylon cords, it is urgently required to prevent failures at bead portions. Such an improvement of radial tire construction for preventing failures at bead portions is most important for applying radial tires to construction vehicles as an industrial utilization. The reason will be clarified by the following explanation.

Different from the trucks and buses, it takes time to exchange tires for construction vehicles. Therefore, exchanging tires are usually intentionally effected in a complete factory maintenance together with adjustment and repairing of other portions of the vehicle at a time of tire exchanging which was previously presumed from wear of the tires.

However, if a failure of the tire (in bead portions in most cases) occurs in an unexpected place at an unexpected time, it is generally difficult to transport the vehicle equipped with the faulty tire to the complete maintenance factory. This occurs because of the heavy weight of the vehicle. Even if it is possible to transport the vehicle to the maintenance factory, such transportation of the vehicle is very expensive and time consuming. In addition, the vehicle must be transported to the factory at a time other than the scheduled time so that the maintenance operation for the other portions of the vehicle could not be effected simultaneously in most cases. Therefore, it requires twice the cost and twice the down time (inoperative time) for the vehicle. Accordingly, the failure of a tire at an unexpected time considerably lowers productivity and increases direct costs. The low productivity and the increased costs are very disadvantageous for a user of the construction vehicle.

As above described, the failure at bead portions is the weakest point for the radial tires using steel cord plies for construction vehicles. Parts of the bead portions in contact with rim flanges with a high surface pressure can be regarded approximately a fixed portions which are firmly urged against the rim flanges. On the other hand, the bead portions are subjected to axial compressive forces in radial directions and bending moment. The failure at the bead portion is mainly caused by the fact that the bead portions radially outwardly of the fixed portions are subjected to the axial compressive forces and the bending moments. First, the bead portions located immediately radially outwardly of the rim flange fall down axially outwardly by the bending moments B.M. Therefore, shearing strains are caused by the axial compressive forces A.C. and the bending moment B.M. between turn-up portions of carcass plies and rubbers and between bead portion reinforcing layers embedded in the bead portions and rubbers thereabout under falling down of the bead portions by the bending moment B.M. Moreover, the shearing strains are added with shearing strains in proportion to the amount of the falling down.

The failure of the bead portion is caused by these shearing strains in the following manner. Cracks occur at ends of cords outside the bead portions among reinforcing cords and progress along directions of the cords. Fragments of rubber and gases accumulate in the cracks to cause the portions including the cracks to swell until the accumulated substances are released therefrom and cords therein are broken to cause failures of the bead portions.

In order to avoid this, steel cord reinforcing layers have been arranged along turn-up portions of the carcass plies and organic fiber layers such as nylon layers have been arranged outwardly of the steel cord reinforcing layers for the purpose of equalizing the difference in rigidity caused by the steel cord reinforcing layers.

However, concentration of shearing strains can not be avoided and failures of beads often occur so long as the steel cords are used. In the most popularly used solution among further improved measures, only organic fiber layers such as nylon are laminated outwardly of the bead portions, for example, six layers. However, this arrangement could not sufficiently restrain the falling down of the bead portions and the six integral organic fiber reinforcing layers have a fairly high rigidity although each has a low rigidity so that strains would be likely to concentrate at some positions. Therefore, cracks are apt to occur particularly in the reinforcing layers relatively prematurely resulting in separations.

SUMMARY OF THE INVENTION

As can be seen from the above discussion as to unique and particular problems in radial tires for construction vehicles, the failure in bead portions is the weakest point of the tires using steel cords in radial carcass plies.

It is therefore an object of the invention to provide a radial tire for a construction vehicle, which enables improved durability of bead portions to avoid the failure at the bead portions, thereby obtaining practical advantages brought about by improvement of the rate of operation and reduction of the operation cost of the construction vehicle.

In order to accomplish this object, in a radial tire for a construction vehicle, said tire including a substantially cylindrical tread, a pair of sidewalls extending from both ends of the tread radially inwardly and terminating in inner edges having bead cores embedded therein, a carcass made of a steel cord ply radially arranged and extending between the bead cores around which ends of the carcass are turned up, a substantially inextensible belt arranged between the carcass and the tread to form with said carcass a main reinforcing layer, and bead reinforcing layers radially outwardly extending from the proximities of the bead cores, according to the invention each of said bead reinforcing layers comprises at least two sets of fiber cord layers, each of the sets comprising at least two fiber cord layers, and said at least two sets of the fiber cord layers are arranged extending radially outwardly from the proximity of an axially outer portion of the bead core and spaced from each other to have a minimum spaced distance in the proximity of the bead core and a maximum spaced distance at radially outer end between the two sets of fiber cord layers, said fiber cord layers within said sets being substantially uniformly spaced from each other. The uniform spacing of the fiber cord layers within the sets being shown in FIGS. 2-9.

In order that the invention may be more clearly understood, preferred embodiments will be described, by way of example, with reference to the accompanying drawings.

DETAILED EXPLANATION OF THE PREFERRED EMBODIMENTS

Figure 1:
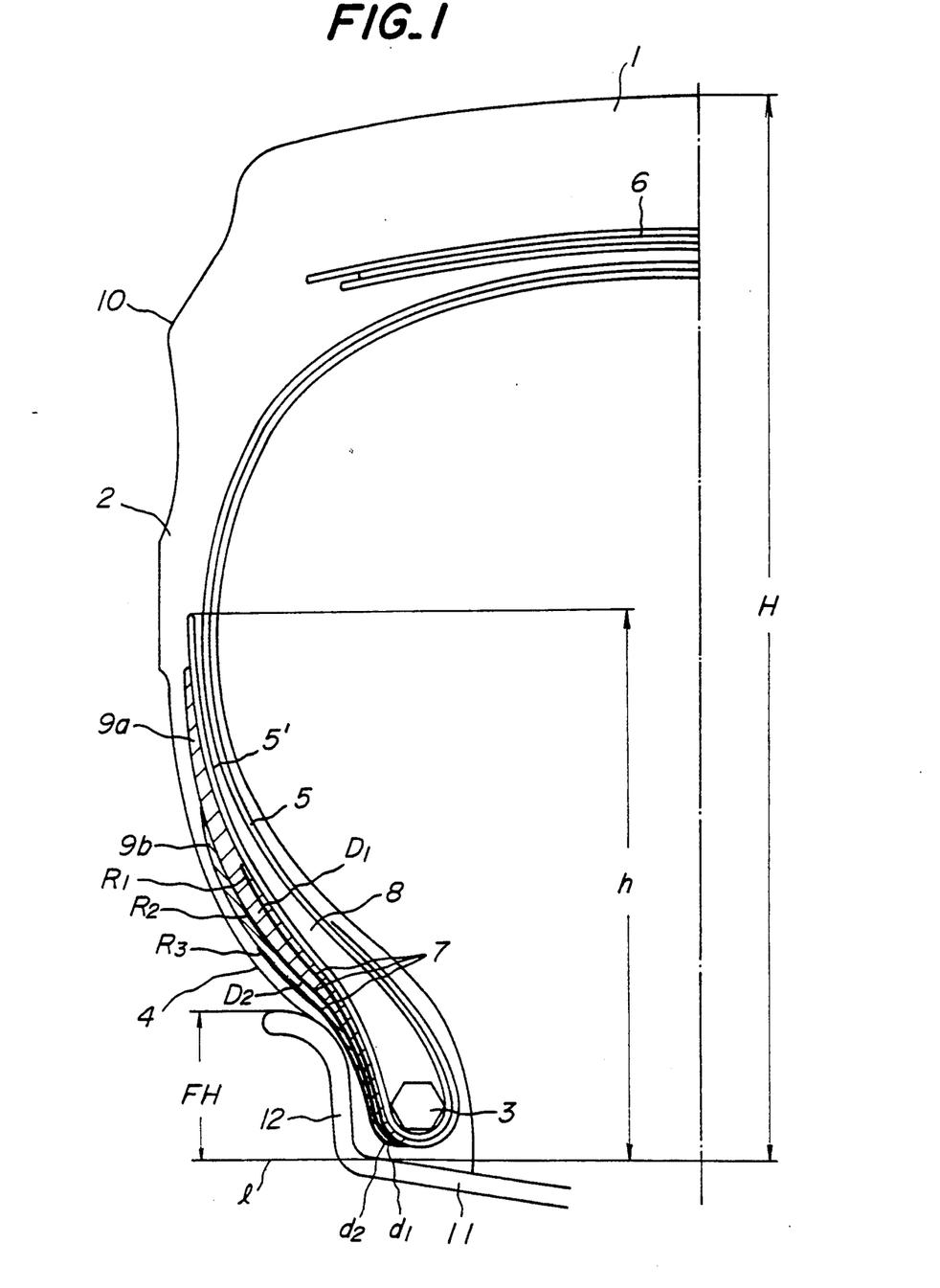
FIG. 1 is a sectional view of a radial tire for a construction vehicle according to the invention.

FIG. 1 illustrates one embodiment of a radial tire for a construction vehicle according to the invention. The tire comprises a cylindrical tread 1 and sidewalls 2 which extend from both ends of the tread 1 and terminate in bead portions 4 having bead cores 3 embedded in inner edges of the sidewalls 2. FIG. 1 illustrates the left half of the tire. It is of course understood that a right half of the tire is similar in construction to the left half shown so that the tire is in symmetry.

A carcass including a steel cord ply turned up around the bead core 3 of course extends to the other bead core not shown in the right half of the tire and is turned up around the other bead core in the same manner. Between the carcass 5 and the tread 1 are arranged a plurality of strip layers, as a belt 6, including substantially inextensible cords, for example, steel cords. The belt 6 and the carcass 5 form a main reinforcing layer for the tire. Moreover, there are provided bead reinforcing layers 7 each extending radially outwardly from the proximity of the bead core 3 along the ply turn-up portion 5' of the carcass 5. The construction above described is similar to the reinforcing construction of the prior art. Particularly, according to the invention the bead reinforcing layers 7 includes fiber cord layer sets, each set consisting of at least two layers. At least two sets of the fiber cord (three sets $R_1$, $R_2$ and $R_3$ in the embodiment shown in FIG. 1) are embedded in the bead portion 4 and extend radially outwardly side from the proximity of the axially outwardly of the bead core 3 with the respective sets of the fiber cord layers spaced by minimum distances $d_1$ and $d_2$ in the proximity of the bead core 3 and maximum distances $D_1$ and $D_2$ at the outer ends radially outwardly of the bead core.

Moreover, FIG. 1 illustrates a bead filler rubber 8, partition rubbers 9a and 9b of the bead portion reinforcing layers 7, and a side protector 10 formed extending from a buttress of the sidewall 2. A rim 11 for mounting the tire thereon has a rim flange 12. The rim 11 is usually according to the JIS or TRA except particular cases.

In FIG. 1, H is a maximum distance from a bead base line 1 to an outermost position of the tread 1 and h is a distance from the bead base line 1 to a radially outermost end of the ply turn-up portion 5'. The bead base line 1 is a straight line passing through a point spaced from a tire axis by a distance one half of a nominal diameter of the rim and in parallel with the tire axis. It is usual that the h is substantially (0.4–0.6) H. Arranged lengths $RH_1$, $RH_2$ and $RH_3$ and $RH_4$ Of the fiber cord sets $R_1$, $R_2$ and $R_3$ used in the bead reinforcing layers 7 and a spaced arranged maximum distance d are determined referring to FIG. 2 depending upon a radial length FH of the rim flange 12 from the bead base line as follows.

Figure 2:
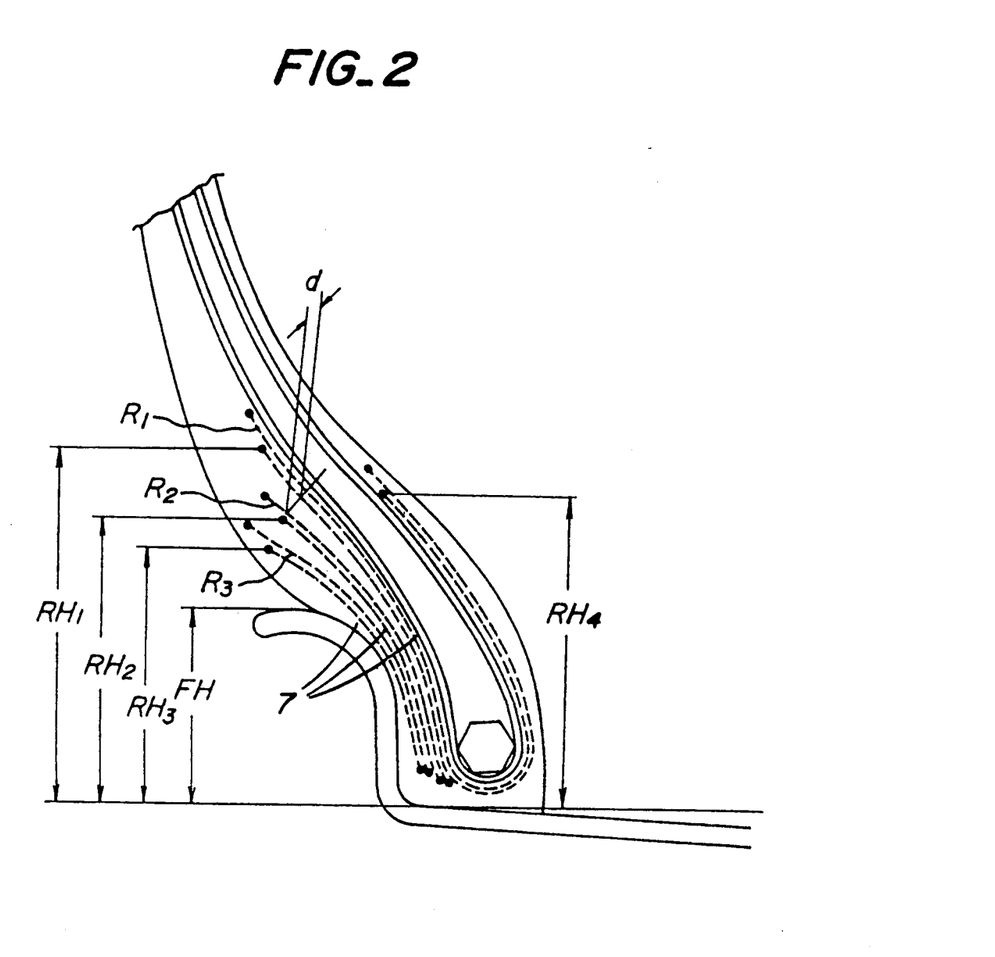
FIGS. 2-9 are partial sectional views of various embodiments of the tire according to the invention illustrating arrangements of the bead reinforcing layers.

$RH_1$ : (2.4–1.6) FH, more preferably (2.2–1.8) FH,
$RH_2$ : (2.1–1.3) FH, more preferably (1.9–1.5) FH,
$RH_3$ : (1.8–1.1) FH, more preferably (1.6–1.2) FH,
$RH_4$ : (1.9–1.1) FH, more preferably (1.7–1.3) FH, and
d : (0.17–0.09) FH, more preferably (0.15–0.11) FH Moreover, the above arranged lengths of the fiber cord layers are vertical lengths of the radially inner fiber layer among the two layers constituting one set from the bead base line 1 and the spaced apart by a maximum distance d which is the vertical distance from a measured point in the fiber cord set more radially inwardly to the fiber cord set more radially outwardly.

The cords used for the bead reinforcing layers 7 may be made of organic materials such as nylon, polyester and polyamide groups or inorganic materials such as carbon fibers. In case of nylon, an arranged density of the order of 32.6/5 cm is suitable with a cord 1260 d/2. Directions of the cords in each of the cord layer sets may intersect or be in parallel with each other. However, in case that the cords in each of the cord layer sets are in parallel with each other, it is preferable to arrange the cords of one cord layer set so as to intersect with the cords of the other cord layer set.

The direction of the cord may be arranged with in a range of 90°–20° which is an angle made by the cord and a tangent to a phantom circle at a point of intersection of the cord and the phantom circle having a center at a tire rotating center and a radius which is one half of a nominal diameter of the rim 11 plus the flange height FH. Moreover, the directions of the cords may be $R_1$: 90°–60°, $R_2$: 60°–30° and $R_3$: 50°–20° for the respective cords or all these directions of the cords may be the substantially the same angle within 20°–40°.

As the partition rubbers 9a and 9b shown in FIG. 1, it is preferable to use, for example, a rubber having a physical property of a modulus 10–30 kgf/cm$^2$ upon 100% elongation.

Moreover, the carcass 5 comprises steel cord plies. In case of a size of 18.00 R33, for example, cords of the carcass 5 are of a strand construction and one layer of $1\times3+9+15+1$ is arranged in a radial surface of the tire. As to the belt 6 of the tire of the same size, two steel cord layers of $7\times7+1$ and two steel cord layers of $3\times7$ of strand construction are preferably arranged in cord angles of 20°–40° so as to form cord angles across an equatorial plane of the tire.

Figure 3:
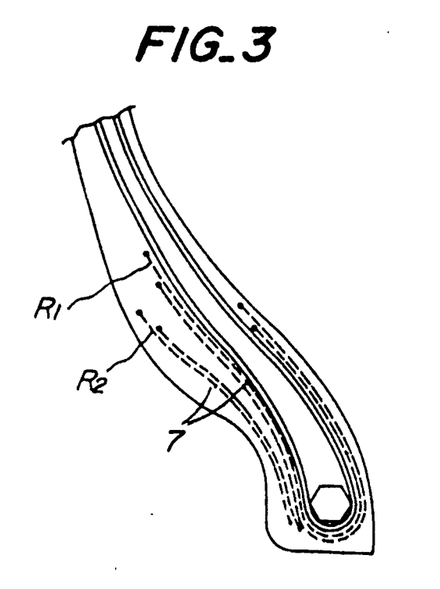
Figure 4:
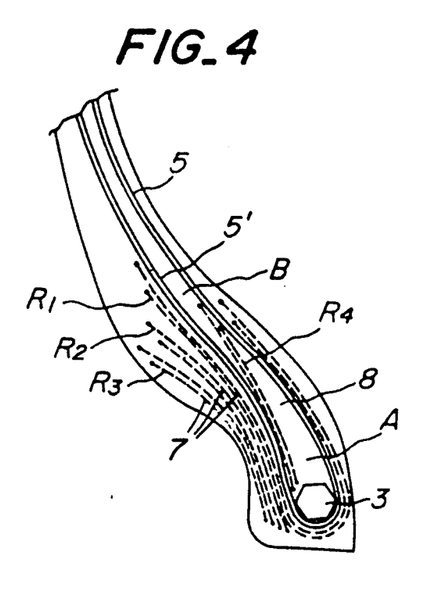

The bead reinforcing layers 7 have been explained referring to FIGS. 1 and 2 using three sets of the fiber cord layers of which two layers form one set. Two sets of fiber cord layers may be employed as shown in FIG. 3. As shown in FIG. 4, moreover, the bead reinforcing layers 7 may be four sets which include additional fiber cord sets $R_4$ forming one set consisting of two layers which divide the bead filler rubber 8 into two parts inside the ply turn-up portion 5' and extend along a boundary between bead filler rubbers A and B made of hard and soft rubbers, respectively.

Figure 5:
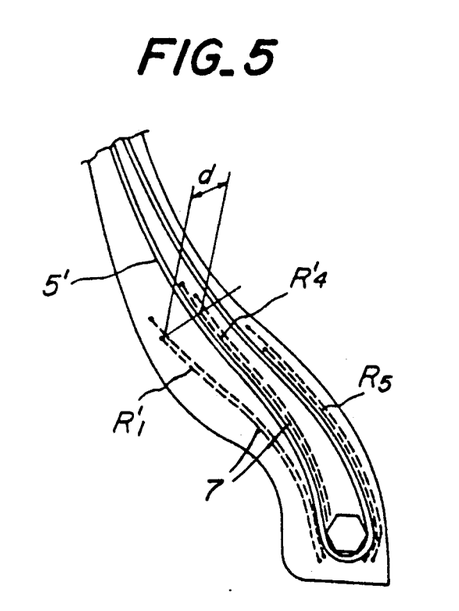
Figure 6:
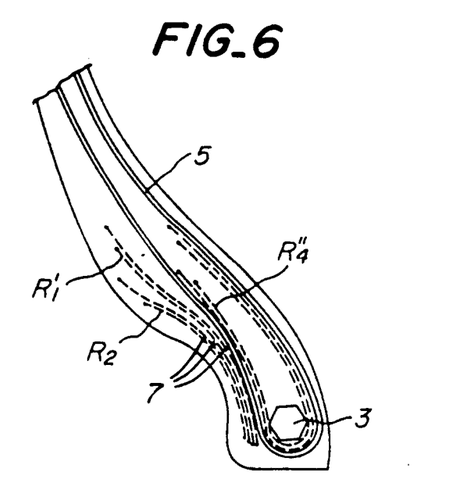
Figure 7:
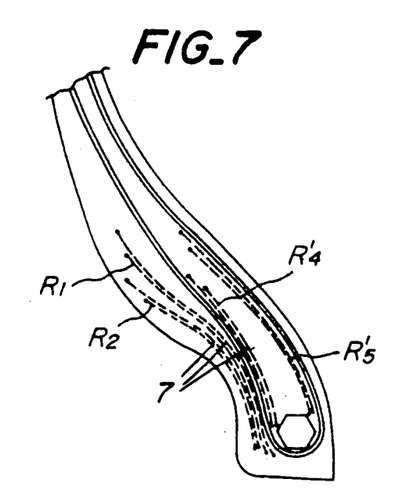

Moreover, the bead reinforcing layers 7 may be arranged in a modified manner as shown in FIG. 5, wherein a ply turn-up portion 5' is embraced by fiber cord sets $R'_1$ and $R'_4$ and a spaced arranged maximum distance d includes a diameter of cords of the ply turn-up portion 5'. Moreover, the fiber cord layers $R'_4$ may extend along the inside of the ply turn-up portion 5' and further fiber cord sets $R_5$ may be added along the inside of the carcass 5. Furthermore, as shown in FIG. 6, fiber cord sets $R''_4$ so-called flippers may surround the bead filler 8 and be turned up around the bead core 3 together with the carcass 5. Moreover, the fiber cord sets $R'_4$ in FIG. 6 may be divided into sets $R''_4$ and $R'_5$ to embrace the bead filler rubber 8 as shown in FIG. 7.

Figure 8:
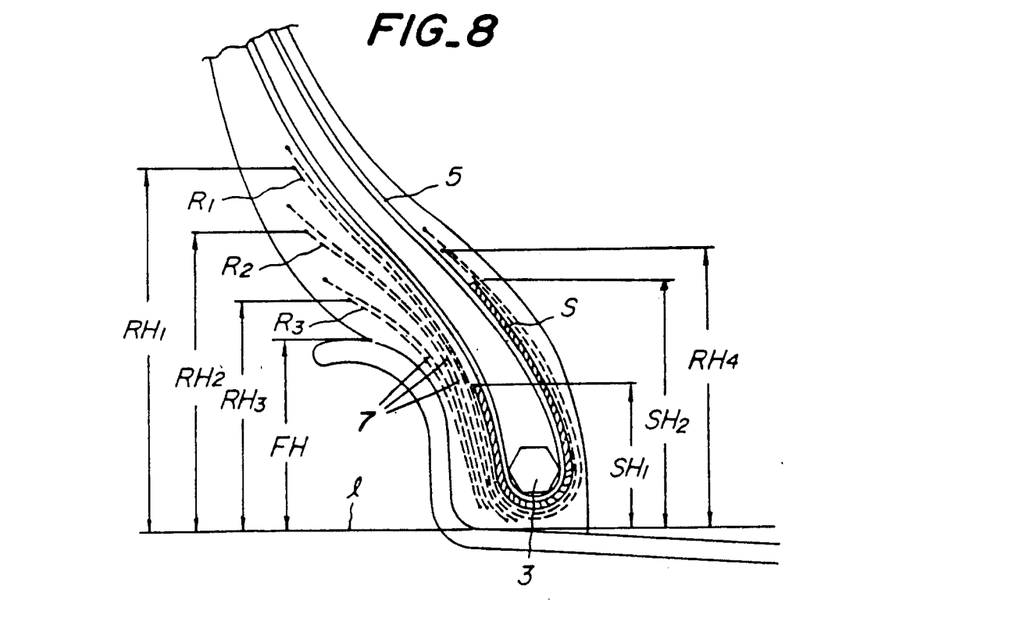
Figure 9:
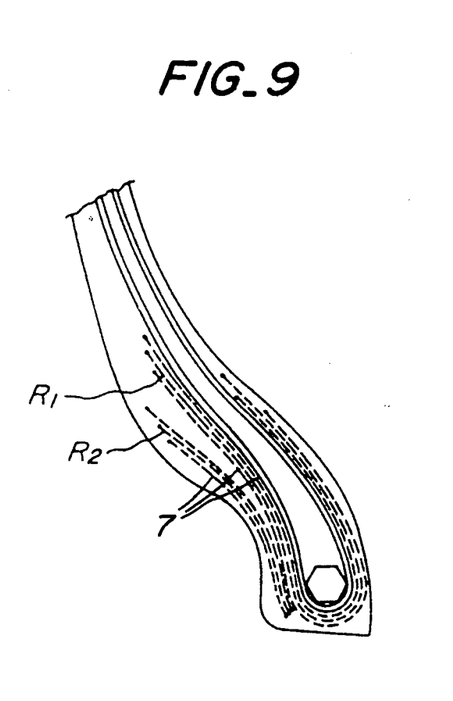

As shown in FIG. 8, a steel cord reinforcing layer S may be added to the construction shown in FIG. 1 or 2. The steel cord reinforcing layer S may be arranged along the carcass layer 5 surrounding the bead core 3 and inside the bead reinforcing layers 7 made of the fiber cord sets $R_1$, $R_2$ and $R_3$. In this case, radial maximum distances of the steel cord reinforcing layer S from the bead base line are $SH_1$: (0.6–1.2) FH, preferably (0.7–1.0) FH on an axially outer side of the bead core 3 and $SH_2$: (0.8–1.4) FH, preferably (0.9–1.2) FH on an axially inner side of the bead core 3. A radial maximum distance $RH_4$ of the fiber cord set $R_1$ from the bead base line on the inner side of the bead core 3 is much longer than the maximum distance $SH_2$. In this case, because the steel cord layer S is enclosed in the fiber cord set $R_1$, any separations at ends of the steel cords S are restrained to accomplish a more effective reinforcement.

The bead reinforcing layers 7 in the above embodiments have been explained as they include sets of layers made of two layers. In contrast herewith, in an embodiment shown in FIG. 9, each set is made of three fiber cord layers and two sets $R_1$ and $R_2$ are provided according to the embodiment in FIG. 3.

Figure 10:
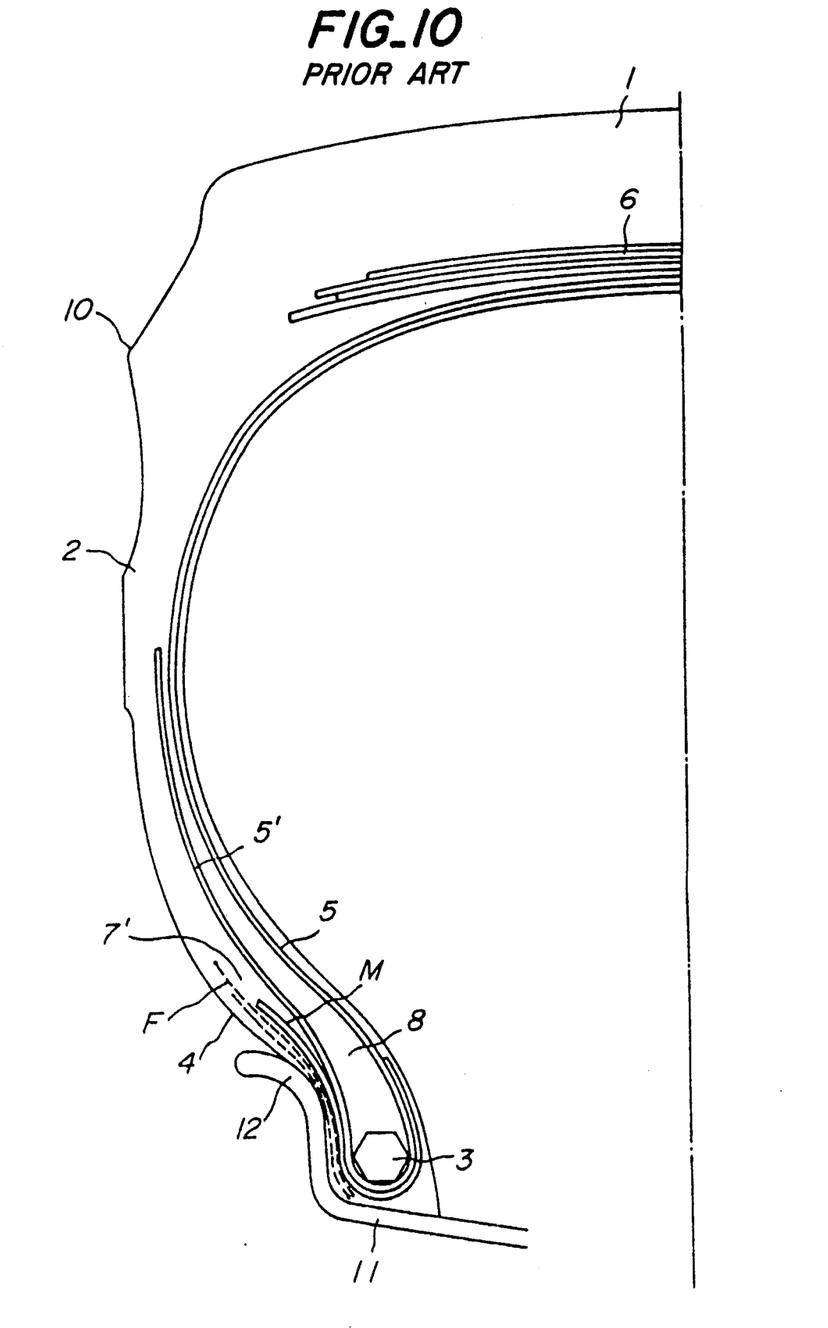
FIGS. 10-13 are partial sectional views illustrating various bead reinforcing means of the prior art.
Figure 11:
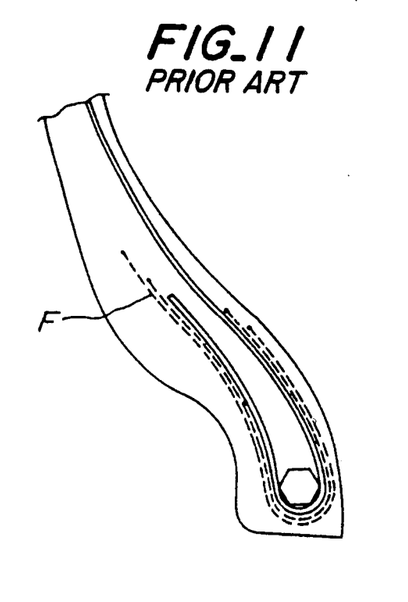
Figure 12:
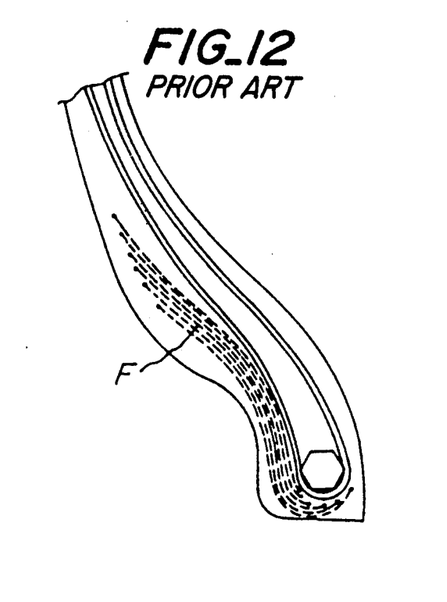
Figure 13:
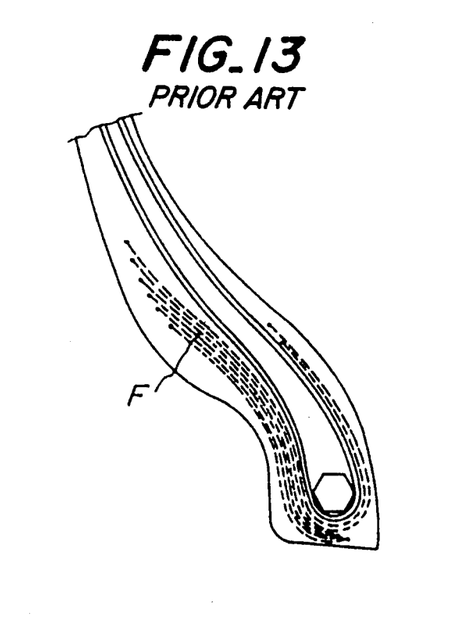

FIG. 10 illustrates a section of a radial tire for a construction vehicle of the prior art, whose bead reinforcing means are shown in various modifications in FIGS. 11-13.

In an embodiment shown in FIG. 10, there is provided a steel cord reinforcing layer M arranged in a zone where a carcass 5 is turned up around a bead core 3, and usually two fiber cord reinforcing layer F arranged covering an end of the steel cord reinforcing layer M on a side of a turn-up portion 5' to reinforce the bead portion. The fiber cord reinforcing layer F serves to prevent separations between an end of the steel cord reinforcing layer M and rubber in the proximity of the end of the layer M.

In this case, the large bead portion reinforcing effect is obtained, but strains are greatly concentrated at cord ends of the steel cord reinforcing layer M. Therefore, it is insufficient to improve the durability of bead portions under the extremely severe condition of use with construction vehicles irrespective of the mitigation of strains by means of the fiber cord reinforcing layers F.

In another embodiment shown in FIG. 11, only fiber cord layers F of the order of two layers are arranged starting from a position beyond the cord ends of the ply turn-up portion 5' of the carcass 5 and extends around the bead portion to a position somewhat nearer to the bead portion than the starting position. This arrangement exhibits less bead reinforcing effect so that strain concentration is likely to occur at cord ends of the fiber cord layers F itself, with the result that separations would occur thereat.

On the other hand, in embodiments shown in FIGS. 12 and 13 the number of the fiber cord reinforcing layers F is increased to the order of six to increase the bead reinforcing effect. However, excessive interlaminar shearing strains occur in a radially outer zone of the fiber cord reinforcing layers F to cause separations between the reinforcing layers resulting in breakage of the cords.

As can be seen from the above explanation of the conventional bead reinforcing means, although the fiber reinforcing layers F serve to reinforce the bead portions, strains are concentrated in the reinforcing layers F themselves due to the reinforcement to form a cause of failure (owing to great alternate loads in traveling particularly on rough grounds).

In consideration of the fact that the bead reinforcing layers arranged on axially outer side are particularly important for prevention of separations, according to the invention respective sets of fiber reinforcing layers are formed by at least two layers. These sets of reinforcing layers are arranged spaced at more than two positions to reduce strains to be supported by the reinforcing layers. More particularly, thick rubbers are inserted between the proximities or ends of the reinforcing layers where falling down of the layers are maximum, thereby restraining the falling down of the bead portions and at the same time reducing the strains as a whole to obtain a double effect.

Example

Tires having a size of 18.00 R33 for off the road were prepared with the fundamental construction in FIG. 1 and the reinforcements according to FIG. 2 (Embodiment 1) and FIG. 3 (Embodiment 2). On the other hand, tires of the same size of the prior art were prepared having the bead reinforcement as shown in FIG. 12 and tires of the same size (Comparative Example) were prepared which have no bead reinforcement in order to eliminate the source of failures at the bead portions.

With exception of the tires of Comparative Example, the fiber cord layers had nylon cords of 1260 d/2 whose cord angles were 30°, each angle formed by a tangent to a phantom circle at an intersection of a cord and the phantom circle concentric to a rim flange 12 and having a diameter equal to that of the rim flange 12. Directions of the fiber cords in one set were alternately intersected and a mean density of the cords was 32.6/5 cm. Between the respective reinforcing layer sets of two nylon cord layers were interposed partition rubbers 9a and 9b having a modulus of 22 kg/cm$^2$ on 100% elongation so that distances d between the respective sets of cord layers were 0.13 FH (8 mm).

Respective values of RH were
in Embodiment 1
$RH_1$ : 2.0 FH (127 mm)
$RH_2$ : 1.7 FH (108 mm)
$RH_3$ : 1.4 FH ( 89 mm)
$RH_4$ : 1.5 FH ( 95 mm) and
in Embodiment 2
$RH_1$ : 2.0 FH (127 mm)
$RH_2$ : 1.7 FH (108 mm) and
$RH_4$ : 1.5 FH ( 95 mm).

In contrast herewith, in the tires of the prior art according to FIG. 10, a spaced arranged maximum distance d was 1.0 mm–2.0 mm and a step was about 15 mm which was a difference in length between longer and shorter fiber cord layers at the radially outer end thereof.

A carcass 3 of all the tires was one ply of steel cords radially arranged and having a strand construction of $1\times3+9+15+1$. A belt 6 of all the tires included steel cord layers comprising two layers of $7\times7+1$ and two layers of $3\times7$, and these cords intersected with each other whose angles were 23° with respect to a equatorial plane.

The tires were filled with inner pressure of 7.0 kgf/cm$^2$ and tested on their drum bead durability on a drum having a diameter of 5 m of a bead durability testing machine. Each of the tires was rolled on the drum at a circumferential speed of 20 km/h under a load of 15.9 tons (150% load). Comparison of durability in connection with lateral rigidity in axial directions was obtained as follows.

|  | Comparative Example | Prior art | Embodiment 1 | Embodiment 2 |
| --- | --- | --- | --- | --- |
| Longitudinal rigidity | 100 | 103 | 105.5 | 103.2 |
| Bead durability | 100 | 170 | 310 | 228 |

Figure 14:
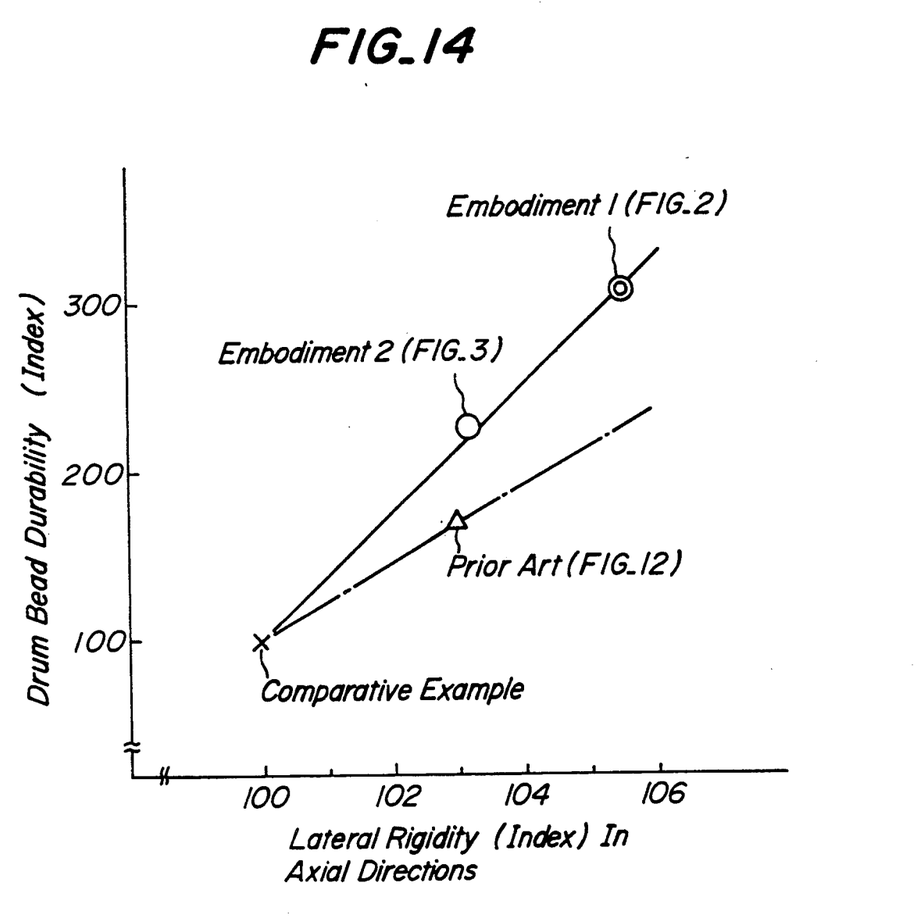
FIG. 14 is a graph illustrating the effect of the invention distinguishable from those of the prior art.

These results are shown in FIG. 14. In the results, larger numerals are better.

As can be seen from the above explanation, different from the bead reinforcement using fiber reinforcing layers of the most improved prior art, at least two sets of layers, each set comprising at least two fiber reinforcing cord layers, are arranged adjacent each other in the proximity of each of bead cores with maximum spaced distances on the side of the radially outer ends. As a result, in addition of the improvement of the lateral rigidity in axial directions, the durability of bead portions are accomplished to a great extent for tires for construction vehicles.

It is further understood by those skilled in the art that the foregoing description is that of preferred embodiments of the disclosed tires and that various changes and modifications may be made in the invention without departing from the spirit and scope thereof.

What is claimed is:

1. A radial tire for a construction vehicle, said tire comprising a substantially cylindrical tread, a pair of sidewalls extending from both ends of the tread radially inwardly and terminating in inner edges having bead cores embedded therein, a carcass made of a steel cord ply radially arranged and extending between the bead cores around which ends of the carcass are turned up, a substantially inextensible belt arranged between the carcass and the tread to form with said carcass a main reinforcing layer, and bead reinforcing layers radially outwardly extending from the proximities of the bead cores, wherein each of said bead reinforcing layers comprises at least two sets, each of the sets comprising at least two fiber cord layers, and said at least two sets of the fiber cord layers being arranged extending radially outwardly from the proximity of an axially outer portion of the bead core and are progressively spaced from each other to have a minimum spaced distance in proximity of the bead core and a maximum spaced distance at radially outer end between the two sets of fiber cord layers said fiber cord layers within said sets being substantially uniformly spaced from each other.

2. A radial tire as set forth in claim 1, wherein each of said bead reinforcing layers comprises three sets of fiber cord layers.

3. A radial tire as set forth in claim 1, wherein each of said bead reinforcing layers comprises two sets and one of the sets of the layers is turned up around the bead core extending axially inwardly of the tire carcass.

4. A radial tire as set forth in claim 1, wherein one set of fiber cord layers, each set comprising two layers is arranged in an inside of a turn-up portion of the carcass to divide a bead filler in the turn-up portion into two portions.

5. A radial tire as set forth in claim 1, wherein each of said bead reinforcing layers comprises three sets of fiber cord layers, first set extending axially outwardly of a turn-up portion of the carcass, second set extending inside and along the turn-up portion, and third set extending along an axially inner side of the carcass.

6. A radial tire as set forth in claim 1, wherein one set of the fiber cord layers extends in a turn-up portion of the carcass and is turned up together with the carcass around the bead core to surround a bead filler rubber in the turn-up portion.

7. A radial tire as set forth in claim 1, wherein two sets of the fiber cord layers extend in an inside of a turn-up portion of the carcass to embrace a bead filler rubber in the turn-up portion.

8. A radial tire as set forth in claim 1, wherein each of said bead reinforcing layers further comprises a steel cord reinforcing layer inwardly of the fiber cord layers and along the carcass surrounding the bead core.

9. A radial tire as set forth in claim 1, wherein said each of the sets comprises three fiber cord layers.

10. A radial tire as set forth in claim 1, wherein the maximum spaced distance d between the two sets of fiber cord layers is $(0.17-0.09)$ FH, wherein FH is a radial length of a standardized rim flange on a normal rim for said radial tire from a bead base line which is a straight line passing through a point spaced from a tire axis by a distance one half of a nominal diameter of a rim and in parallel with the tire axis.

11. A radial tire as set forth in claim 1 wherein a radial distance of a turn-up portion of said carcass ply is in the range of 0.4–0.6 of the tire sectional height.

12. A radial tire as set forth in claim 1 wherein fiber cord sets comprise three sets radially spaced from a bead base line as a function of a radial length of a rim flange FH upon which said tire is mounted by functions $RH_1 = (2.4-1.4)$ FH $RH_2 = (2.1-1.3)$ FH, $RH_3 = (1.8-1.1)$ FH where $RH_1$, $RH_2$, and $RH_3$ are radial lengths of the axially outward portions of each of said sets.

13. A radial tire as set forth in claim 1 wherein cords of said reinforcing layers are organic fibers.

14. A radial tire as set forth in claim 13 wherein said organic fibers are selected from the group consisting of nylon, polyester and polyamide.

15. A radial tire as set forth in claim 1 wherein cords of said reinforcing layers are inorganic fibers.

16. A radial tire as set forth in claim 15 wherein said inorganic fibers are carbon fibers.

17. A radial tire as set forth in claim 1 wherein cords in respective sets of fiber cord layers intersect with each other.

18. A radial tire as set forth in claim 1 further comprising partition rubbers interposed between bead reinforcing layers, wherein a modulus at 100% elongation of said partition rubbers is in the range of 10–30 $kgf/cm^2$.

* * * * *